United States Patent [19]

Kuze

[11] 4,419,761
[45] Dec. 6, 1983

[54] SEQUENCE CONTROL SYSTEM

[76] Inventor: Yoshikazu Kuze, 31-3, Higashi Magome 1-chome, Ohta-ku, Tokyo, 143, Japan

[21] Appl. No.: 201,065
[22] PCT Filed: Oct. 2, 1978
[86] PCT No.: PCT/JP78/00001
§ 371 Date: Jun. 2, 1980
§ 102(e) Date: Jun. 2, 1980
[87] PCT Pub. No.: WO80/00756
PCT Pub. Date: Apr. 17, 1980

[51] Int. Cl.$^3$ .................. G06F 15/46; G06F 3/05
[52] U.S. Cl. ........................................ 377/16; 364/143
[58] Field of Search .............. 364/900 MS File, 569, 364/143, 144, 146, 147; 235/92 CT, 92 DE, 92 PE, 92 T; 377/15, 16, 20

[56] References Cited

U.S. PATENT DOCUMENTS

| Re. 29,642 | 5/1978 | Kwiatkowski | 364/900 |
|---|---|---|---|
| 3,800,253 | 3/1974 | Bryant | 235/92 PE X |
| 4,102,492 | 7/1978 | Gold | 235/92 CT X |
| 4,190,884 | 2/1980 | Medina | 364/146 X |
| 4,196,344 | 4/1980 | Kuze | 235/92 CT |
| 4,225,776 | 9/1980 | Meisner | 364/900 X |
| 4,250,370 | 2/1981 | Sasaki | 235/92 T X |

Primary Examiner—Edward J. Wise
Attorney, Agent, or Firm—Birch, Stewart, Kolasch & Birch

[57] ABSTRACT

A sequence control system is disclosed which divides data entered onto a time-chart into "1" data (hereinafter referred to as "black dot") and "0" data (hereinafter referred to as "white dot"), and is capable of programming parallel-output data on 16 channels in an inner memory within 2-3 minutes by operation of black dot and white dot key switches and also provides the capability of changing the program in about 10 seconds per line of data. The data is generated by only presetting a cycle-time and putting a start switch.

A simplified data storage system is disclosed which places on or off data in the memory in locations which correspond to relative times in the sequence cycle. Thus, the system of the present invention need only address respective locations in memory corresponding to the relative cycle time in order to determine the status of the various outputs.

10 Claims, 20 Drawing Figures

SEQUENCE CONTROL SYSTEM

This application is based upon international application #PCT/JP78/00001, filed on Oct. 2, 1978.

FIELD OF THE INVENTION

The present invention relates to a sequence controller, and more particularly to a programmable logic controller (PLC) of a stored program type with which data programming and its modification can be done extremely easily and rapidly.

BACKGROUND ART

Heretofore, various kinds of sequence controllers such as diode matrix systems, quasi-computer systems, or computer systems have been used in the control art. However, for controlling multiple subjects with such a conventional system, a very complicated and expensive sequence control system is required. Moreover, in order to carry out the programming and changing thereof, skilled programmers are required. Therefore, in case there is no person available for such purposes, the programming is often made by an outside party, which will result in the leakage of user's original technical know-how to the outside. The present invention is to provide a sequence control system in which programming of control data and modification of the program can be done easily and rapidly by those who are unskilled in the art.

SUMMARY OF THE INVENTION

Accordingly, it is the object of the present invention to provide a novel and improved sequence control system which enables anybody to easily and rapidly program data for sequence control and to modify the program thus made, and which has a considerably improved performance and may be designed compactly to be held in hand.

In the present invention, data for the sequence control is divided into "1"s (black) data and "0"s (white) data and this data is written in the form of a time chart on a memory sheet. The "1" data is indicated with a black dot and the "0" data is indicated with a white dot. The number of the dot is adapted to correspond to the number of a write-in timing clock pulse generated by the control system. By pushing a black key and a white key on a keyboard the times corresponding to the number of each dot, "1" data, and "0" data are written in a memory of the sequence control system.

The sequence control system according to the present invention provides, for example, outputs for 16 cycles or stages as a standard type. For the convenience of explanation, assume here that the system of the present invention employs a memory of 1024 words × 1 bit for one cycle, thus 16 memories M1, M2–M16 are used for the total of 16 cycles. It takes only several seconds to write the data for one cycle in the memory. Consequently, writing of data for 16 cycles may be done for only 2 or 3 minutes.

To read out the data stored in the memories, a desirable cycle time is selected, and then a start switch is depressed. The data is read out repeatedly from the memories at the period of the selected cycle time.

The sequence control system according to the present invention is applicable to automation of various kinds of machines and installations such as machine tools, assembling machines, packaging machines, testing and inspecting machines, etc. Because the present invention has a remote I/O (Input/Output) function, a group of machines governed, respectively, by the sequence control system of the present invention can also be controlled by a control system according to the present invention. Thus, the automation of the factory may be achieved at a reduced cost.

An emergency detector is provided separately. If the output is connected to the detection connector of the sequence control system, the output of the system is immediately stopped when any abnormal operation occurs. Further, by coupling the extension connectors of the control system with each other, the number of the cycle of the sequence control can be increased.

The memory employed in the present invention is C-MOS RAM which consumes a very little power and thus can be backed up by batteries. In addition, to cope with any accidental power failure, a power failure detection circuit and flip-flop are provided. Thus, the sequence control system according to the present invention makes it possible to avoid any confusion or trouble which will occur due to the power failure or unforeseen recovery of the power supply.

DETAILED DESCRIPTION OF THE PREFERRED EMBODIMENT

Figure 1:
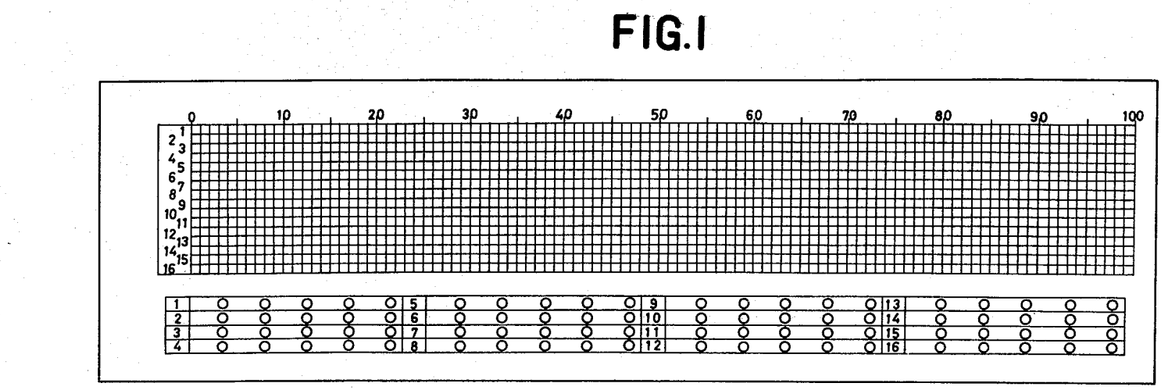
FIG. 1 shows a memory sheet for sequence time chart used in the sequence control system according to the present invention.
Figure 2:
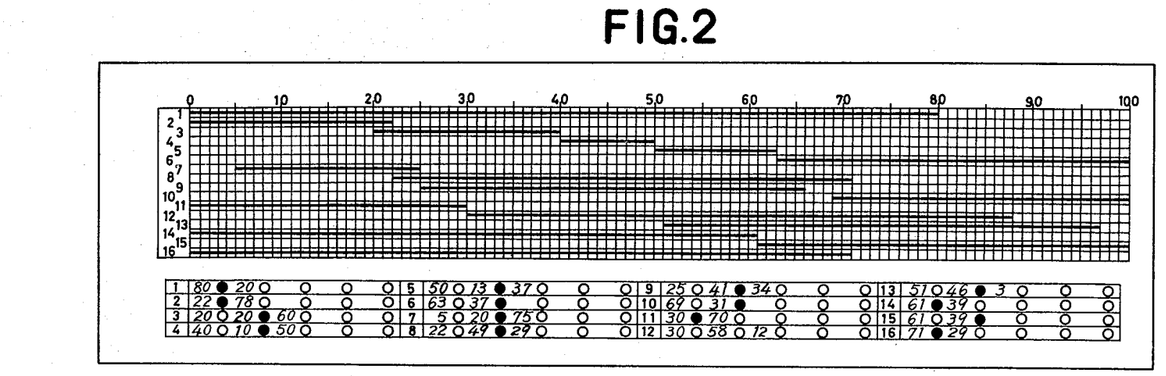
FIG. 2 shows an example of the time chart written in the memory sheet of FIG. 1 and a digital indication of the time chart in which the period of the time by the black section and that of blank section are converted to the number of the black dot and the number of the white dot for each cycle.

Referring now to FIG. 1 illustrating an example of memory sheet for a sequence time chart, the numerals 0 to 100 of the upper column indicate the number of write timing clock pulses generated in one cycle or one stage, while the numerals arranged vertically along the left-hand edge depict the number of the cycle or sequence stage. As shown in FIG. 2, a sequence time chart is prepared in the upper column, and in the lower column, the above time chart is indicated digitally by the number of the black sections "1" and blank sections "0" in each sequence stage. For example, the time chart in the first sequence stage is indicated with 80 black dots and 20 white dots. That is to say, the first sequence stage is completed with 80 successive data "1" and 20 successive data "0". The second sequence stage is completed with 22 successive data "1" and 78 successive data "0". In this way, the time charts for the 16 parallel sequence stages are shown in the lower column of the memory sheet.

Figure 3:
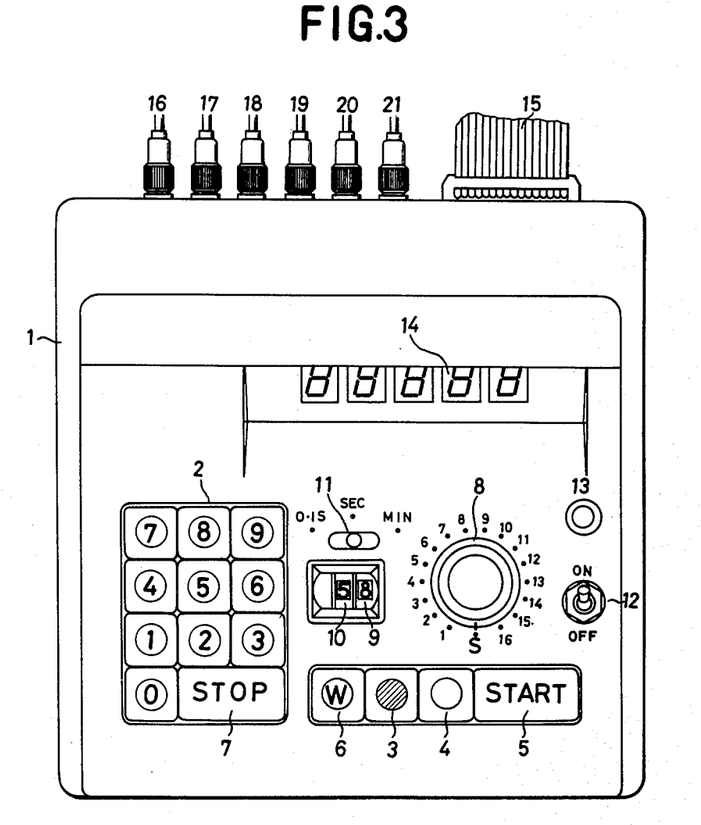
FIG. 3 is a plan view of a sequence controller according to the present invention.

FIG. 3 is a top plan view of the sequence controller according to the present invention. The reference numeral 1 depicts a case; 2, keyboard; 3, black dot switch for "1" data; 4, white dot switch for "0" data; 5, start switch; 6, write (W) switch; 7, stop switch; 8, cycle select switch; 9 and 10 depict preset code switches, respectively. Digits (5, 8) displayed in the switches 9, 10 mean the sequence cycle time and any desired sequence cycle time may be set by operating the switches. Further, the numeral 11 indicates a cycle time select switch, and the numeral 12 designates a changeover switch. When the changeover switch is turned OFF one cycle of operation is done, while the switch is turned ON, the cycle is repeated. The reference numeral 13 depicts a reset switch; 14, count display; 15, ribbon cable; 16, and 17, abnormality detection connectors, respectively. Numerals 18 and 19 designate extension connectors, 20, connector for connection to a remote-control stop switch; and 21 indicates a connector for connection to a remote-control start switch. The sequence controller in accordance with the present invention is connected by means of the ribbon cable 15 to a relay device (not shown) which is separately provided to control the controlled system or load. The sequence control system of the present invention is constructed as described in the above, of which operation will be briefly explained hereinafter.

Writing of data is started by the writing of the first sequence stage indicated on the memory sheet. At first, the cycle select switch 8 is set to the stage "1" on the dial scale, so that the corresponding memory M1 may be selected. Then, the write switch 6 (W) is depressed. Since the number of the black dot ("1" data) in the first sequence stage is 80, the keys "8" and "0" in the key board 2 are depressed sequentially and the black dot switch 3 is pushed. Then, the keys "2" and "0" in the keyboard are depressed for white dot and the white dot switch 4 is depressed. Thus, the data for the first sequence stage is written and stored in the memory M1. Subsequently, proceeding is made to the next second stage of operation. More particularly, the cycle select switch 8 is set to "2" to select the corresponding memory M2, the key "2" in the keyboard is depressed two times and the write dot switch 3 is pushed. Then the keys "7" and "8" are depressed and the write dot switch 4 is pushed. Now the data for the second cycle is written in the memory M2. Similarly, the data for the remaining cycles are written in the respective memories M3 to M16. It takes only 2 to 3 minutes to write all the data of 16 cycles in the corresponding memory.

In order to read the data stored in the memories, a cycle time is first determined. For this purpose, the preset code switches 9 and 10 and the select switch 11 are operated to select a necessary cycle time. If the select switch 11 is set to "0.1 SEC", digits "58" set in the preset code switches 9 and 10 means that a cycle time of 5.8 sec is provided. If the select switch 11 is set to "1 SEC", the cycle time is 58 sec. Further, setting the select switch 11 to "MIN" makes the cycle time 58 minutes. Each of the digits of the preset code switches 9 and 10 may be changed from "0" to "9". Accordingly, 297 kinds of cycle time are available in total.

The ribbon cable 15 is connected to an output relay array (not shown) the output circuit of which is connected to an external load, and the start switch 5 is depressed. By placing the change-over switch 12 to OFF, the output is completed in one cycle. On the contrary, if the changeover switch 12 is set to ON, output will be repeatedly provided, thus, the intended operation continues in repeated manner. In this case, the data drives the output circuit.

Figure 4:
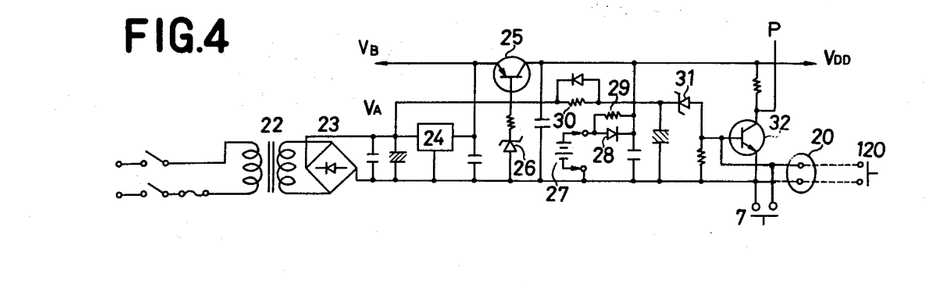
FIG. 4 shows a power circuit including a power failure detecting circuit.

FIG. 4 illustrates the power circuit including a power failure detection circuit. This power circuit comprises a transformer 22, a rectifier circuit 23 and a constant-voltage integrated circuit 24 to provide a system voltage $V_B$. When the power circuit is turned on, the current flows through the emitter of a PNP transistor 25, resistor and a Zener diode 26 to the ground, thus the transistor 25 is turned on to supply a voltage VD to the memory system. When the power supply is interrupted, the transistor 25 is turned off, and the voltage of a battery 27 is applied through a diode 28 to the memory system to maintain the content of the memories. The battery for back-up of the memory may be lithium battery, alkali battery, or the like, which is high in enery density, or a chargeable Ni-Cd battery or the like. In case an Ni-Cd battery is used, a resistor 29 is connected in parallel to the diode 28. In case of a lithium or alkali battery being used, the above-mentioned resistor 29 should be eliminated.

The power failure detection circuit will now be explained below. The constant-voltage IC 24 is connected at the input side VA thereof to the base of a transistor 32 through a resistor 30 and Zener diode 31. When the main power being supplied, the transistor 32 is turned on, the output P of which is 0. However, when the main power is disconnected, the transistor 32 is turned off, its output P will be 1.

Figure 5:
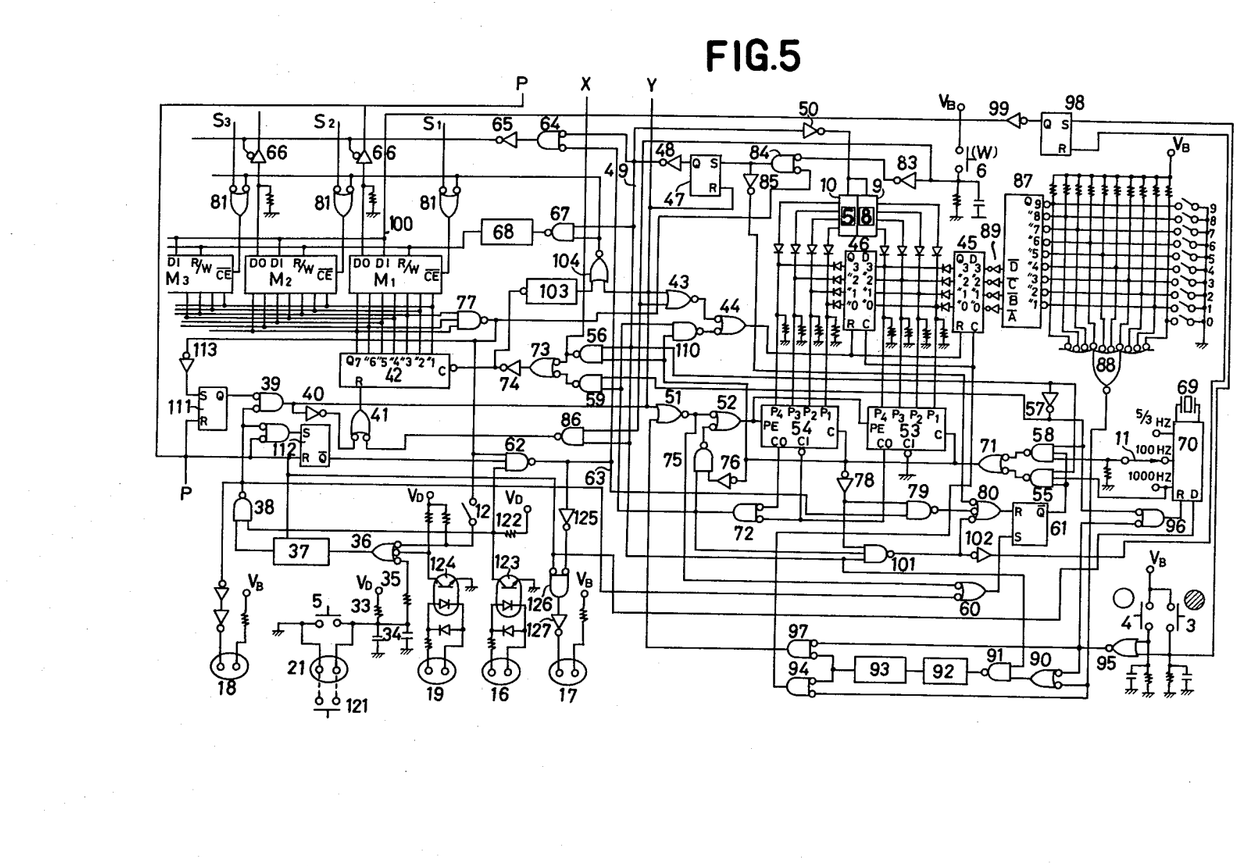
FIG. 5 is a diagram of the sequence control system according to the present invention.

Referring now to FIG. 5, a diagram is illustrated of the subject sequence controller circuit in which 100 timing clock pulses for writing are used, that is, the memory addresses are 100 in number. In order to set each unit to the starting condition, the shortest cycle time is set. To this end, the changeover switch 12 is placed OFF (for one cycle), the select switch 11 is set to "0.1 SEC", the preset code switches 9 and 10 are operated so as to set 01, and then the start switch 5 is depressed. The filter circuit formed with a resistor 33 and capacitor 34 eliminates chattering noise so that a signal 0 enters a 3-input NAND gate 36 through a gate protective resistor 35. From the high output from the gate 36, a high one-shot pulse appears at the output of a one-shot circuit 37. This signal is inverted through a 2-input NAND gate 38, so that a high one-shot pulse appears at the output of a 2-input NOR gate 39. By application of the high one-shot pulse:

(A) A high signal enters the reset terminal R of a binary counter 42 to reset it to the zero state through an inverter 40 and 2-input NAND gate 41.

(B) A high signal is applied to reset terminal R of shift registers 45 and 46 through a 2-input NOR gate 43 and 2-input NAND gate 44 to reset each register to the zero state.

(C) The high one-shot pulse is also applied to a flip-flop 47 at the reset terminal R thereof, so that a high output is produced at its Q output. The output changes the level of the line 49 to 0 through an inverter 48 and opens gates of the preset code switches 9 and 10.

(D) A high input is applied to preset enable inputs PE of BCD up/down counters 53 and 54 through a 2-input NOR gate 51 and 2-input NAND gate 52 to preset their respective contents.

The signal "0" on the line 49, causes a pair of write clock pulse control gates 55 and 56 to be disabled, and the signal is also applied through an inverter 57 to a pair of read clock pulse control gates 58 and 59 which are enabled.

Since the level of the line 49 is 0 and the level of an output line 63 of a 3-input NAND gate 62 is 0 as will be described later, the output of a 2-input NOR gate 64 is 1. The output signal is inverted by an inverter 65 and a low signal is applied to a 3-state buffer 66. Thus, the data output lines DO of memories M1, M2,–M16 will be enabled.

Further, the low signal on the line 49 closes the gate of a 2-input NAND gate 67 and the output of which is fixed to 1. Read/write lines of the memories M1, M2,–M16 are also fixed to 1 through a one-shot pulse generator circuit 68 so that each of the memories will be ready for a reading operation.

Clock pulses are generated by a crystal oscillator 69 the output of which is divided by a frequency divider 70 into 1000 Hz, and 5/3 Hz. Any one of these frequency divider outputs is selected by the select switch 11. The frequencies as 1000, 100 and 5/3 Hz of the outputs were selected to correspond with the number 100 of write timing clock pulses as in FIG. 2. In order to produce 100 pulses, it takes 0.1 sec. at 1000 Hz, 1 sec at 100 Hz and 1 minute at 5/3 Hz.

The frequency divider output is supplied through the select switch 11, read clock pulse control gate 58 and a 2-input NAND gate 71 to the clock lines C of the BCD up/down counters 53 and 54. Preset lines P1, P2, P3 and P4 of the BCD up/down counters are connected to the BCD lines of the preset code switches 9 and 10 and of the shift registers 45 and 46, respectively, by means of the diodes of their respective polarities as shown. Here, it is assumed that the BCD up/down counters are used as down counters by connecting the UP/DOWN terminals thereof to the ground (not shown).

Since the select switch 11 is set 0.1 sec (at 1000 Hz), the clock pulses are connected through the read clock pulse control gate 58 and the 2-input NAND gate 71 to the clock lines C of the BCD down counters 53 and 54. When the BCD down counters were preset, the setting of the preset code switch 9 to a high level was written into the BCD down counter 53, and the setting of the preset code switch 10 to a low or 0 level was written into the BCD down counter 54. Accordingly, a 0 or low signal enters from the carry output $\overline{CO}$ of the down counter 54 into a 2-input NOR gate 72. When one clock pulse enters the BCD down counter 53, the count thereof will decrease by 1 so that the already written 1 changes to 0. Thus, since both the two inputs of the 2-input NOR gate 72 are 0, the gate produces one read clock pulse. This signal is supplied through the read clock pulse control gate 59, a 2-input NAND gate 73 and an inverter 74 to the clock line C of the binary counter 42.

On the other hand, the output of the 2-input NAND gate 72 causes a 2-input NAND gate 75 to produce a 0 when an inverter 76 produces a high output in response to a negative going clock input. Thus, BCD down counters 53 and 54 are preset through the 2-input NAND gate 52. At the same time, the "01" of the preset code switches is written again in the BCD down counters 53 and 54.

When 100 read clock pulses are supplied to the input of the binary counter 42 in this manner, 100 addresses of the memories are addressed. At that time, a multi-input NAND gate 77, connected to the address lines of the binary counter 42 produces a one-cycle end signal 0. That is to say, since the binary number of 100 is 1100100, when 100 clock pulses are counted, outputs on address lines Q3, Q6 and Q7 will be 1. The outputs are fed to the multi-input NAND gate 77 thereby producing the signal 0.

Thus, the signal on the output line 63 from the 3-input NAND gate 62 changes to 1 and a 2-input NAND gate 79 produces an output 0 when an inverter 78 produces a 1 by the negative going clock input. Since the output 0 is applied through a 3-input NAND gate 80 to a reset input of a flip-flop 61, the output 0 of the output $\overline{Q}$ of the flip-flop causes the read pulse control gate 58 to be closed, thus the clock pulses are blocked.

Thus, all the gates are set up in line so that data may readily be written. It takes only 0.1 sec. to complete the read cycle after the start switch 5 is depressed.

Figure 6:
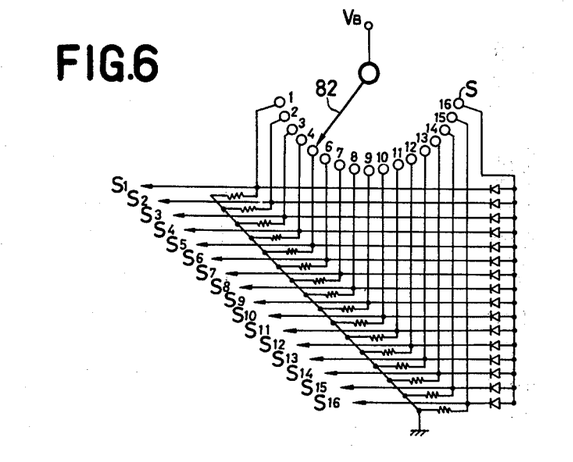
FIG. 6 shows a select switch circuit.

Writing of data is started beginning with the first cycle. Namely, the cycle select switch 8 is first set to "1". The cycle select switch 8 comprises, as shown in FIG. 6, 16 contacts for 16 cycles, and the outputs S1, S2,–S16 are connected to the Chip Enable inputs $\overline{CE}$ of memories M1, M2,–M16 through 2-input NAND gates 81, respectively.

Common contactor 82 of the cycle select switch is normally brought into contact with the contact S, so that output signals of the contacts 1, 2, 3,–,16 are 1. Consequently, the output of each 2-input NAND gate 81 is 0 which is applied to the Chip Enable input $\overline{CE}$. Thus, all the memories are selected. Here, when the common contactor 82 is set to "1", the memory M1 is selected.

Figure 16:
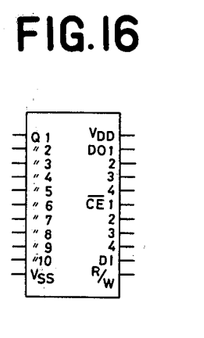
FIGS. 16, 17, 18 and 19 illustrate further examples of memory, respectively.
Figure 17:
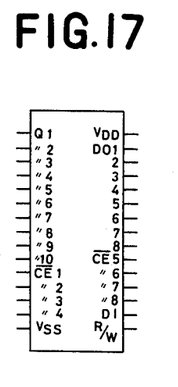
Figure 18:
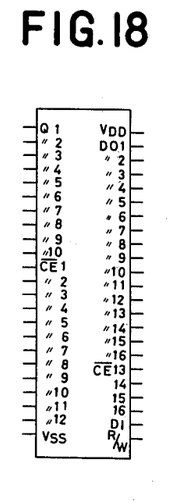

For the convenience of explanation, the embodiment described in the foregoing of the present invention employs one memory (C-MOS RAM) for each cycle, so 16 memory IC's in total. In practice, the present invention employs 4, 8 or 16 sets of large-scale integrated circuits (LSI) provided with Data Outputs DO and Chip Enable inputs $\overline{CE}$, in a compact circuit configuration, as illustrated in FIGS. 16, 17 and 18, respectively. FIG. 16 shows an example in which 4 memories of 1024 words×1 bit are used in parallel; FIG. 17 shows an example using 8 sets of such memories in parallel; and FIG. 18 shows an example using 16 sets of such memories also in parallel.

Thereafter, the write switch 6 (W) is depressed, the following operations are initiated.

(A) Output of an inverter 83 goes to a 0. Because the output of the multi-input NAND gate 77 is 0, the output of a 2-input NOR gate 84 will be 1. The output 0 is applied through an inverter 85 to the 3-input NAND gate 80 the output of which in turn will go to a 1. This signal 1 is applied to the reset input R of the flip-flop 61 thereby $\overline{Q}$ output goes to a 0 which closes the read clock pulse control gate 58.

(B) The output 1 of the 2-input NOR gate 84 is also applied to the set input S of the flip-flop 47, so that the Q output will change to a 0 which in turn will be a 1 through the inverter 48. Therefore, the level of the line 49 is 1 thereby closing the gates of the preset code switches 9 and 10.

(C) This high signal on the line 49 causes the write clock pulse control gate 56 to open, while the read clock pulse control gate 59 is closed through the inverter 57.

(D) The output of a 2-input NAND gate 86 which receives a logic 1 on the line 49 and a logic 1 from the write switch 6 (W) will generate a logic 0 which is applied to the reset input R of the binary counter 42 through the 2-input NAND gate 41, so as to reset it.

(E) The high signal on the line 49 is applied to the 2-input NOR gate 64 the output of which will be 0 causing the output of the inverter 65 to go high. The output, a logic 1 is applied to the 3-state buffer 66 to close each Date Output line DO of the memories M1, M2,–,M16.

Inputs Q1, Q2,–,Q9 of an encoder 87 are pulled up through resistors, respectively, to $V_B$, and connected to the inputs of a multi-input AND gate 88, further connected via the switches 1, 2,–,9 to the ground. BCD outputs of the encoder 87 are connected to the shift register 45 through inverters 89, respectively.

To write 80 black dot data "1", first the key "8" in the keyboard 2 is depressed. The input Q8 of the encoder 87 which is connected to the key "8" go to 0, and a 4-bit binary code 1000 corresponding to the depressed key "8" appears at D0, D1, D2 and D3 of the shift register 45 through the BCD outputs $\overline{A}$, $\overline{B}$, $\overline{C}$ and $\overline{D}$ of the encoder 87. The output of the multi-input AND gate 88 will go low to provide a logic 0 to the input of a 2-input NAND gate 90. Thus, the output of the gate 90 will be a logic 1 and the output of a 2-input NAND gate 91 will be a logic 0. This logic 0 output is applied via a delay circuit 92 to a one-shot pulse generator 93 to provide logic 0 one-shot pulses. Then, the signal is inverted through a 2-input NOR gate 94 to provide logic 1 one-shot pulses. Accordingly, one clock pulse is fed to the clock lines C of the shift registers 45 and 46. At that time, the above-mentioned binary code 1000 corresponding to the key "8" is shifted and appears at the output Q0, Q1, Q2 and Q3 of the shift register 45.

Subsequently, the black dot switch 3 is depressed, thereby causing the output of a 2-input NOR gate 95 to go to 0. While the black dot switch 3 is depressed, the output of a 2-input NOR gate 96 is a logic 1 which is applied to the Reset input R of the frequency divider 70 which in turn will be reset to stop the generation of clock pulses.

The output 0 of the 2-input NOR gate 95 is also applied to the 2-input NAND gate 90, so that the one-shot pulse generator circuit 93 produces a logic 0 one-shot pulse. The pulse is inverted by a 2-input NOR gate 97 to provide a one-shot logic 0 pulse. Consequently, the output of the 2-input NOR gate 51 changes to one-shot logic 0 pulse to preset the BCD down counters 53 and 54 through the 2-input NAND gate 52. Thus, the "0" in the shift register 45 is written into the BCD down counter 53, while the "8" in the shift register 46 is into the BCD down counter 54.

On the other hand, the one-shot pulse "0" from the 2-input NOR gate 51 is applied to the 2-input NAND gate 60, so that a high signal is applied to the Set input S of the flip-flop 61. Thus, the high signal at the output $\overline{Q}$ of the flip-flop causes the write clock pulse control gate 55 to be enabled.

Since the high signal is applied to the set input S of a flip-flop 98, the output Q of the flip-flop goes to a logic 0 which is inverted by an inverter 99 to cause the level on the Data Input line 100 of the memories to go high. Thus, the level of the Data Input line DI of the memories M1, M2,–,M16 goes to a logic 1.

When the black dot switch 3 is released, generation of the clock pulse is started. However, since the read clock pulse control gate 58 is closed which is connected to the select switch 11, clock pulse of 1000 Hz passes through the write clock pulse control gate 55 and the 2-input NAND gate 71, then on to the clock line C of the BCD down counters 53 and 54, and to the clock line C of the binary counter 42 through the write clock pulse control gate 56.

Write clock pulses are also applied to a delay circuit 103 and pass through a 2-input NOR gate 104, the 2-input NAND gate 67 and one-shot pulse generator circuit 68 to the Read/Write terminal of the memory M1 in synchronism with the clock pulse.

Since the addresses Q1, Q2,–Q7 of the binary counter 42 are connected to the corresponding addresses, respectively, of the memory M1, a command at the R/W terminal, which is synchronous to the write clock pulse, causes the black dot data "1" to be written into the address cells of the memory M1. Since 80 write clock pulses are generated 80 black dot data "1" are written in the memory cells as described hereinafter.

Each time one clock pulse enters the BCD down counters 53 and 54, the count therein decreases by one. When the count goes down to zero, the upper figure is counted down and the lower figure is changed from "0" to "9". Since initial count in the counters is "80", when the first clock pulse enters the counters, the upper figure changes to "7" and the lower figure to "9". When the second clock pulse is received, the upper figure remains unchanged, while the lower figure changes to "8". When 80 clock pulses are applied, both BCD counters produce logic 0 signals at the Carry output $\overline{CO}$ thereof, while the 2-input NOR gate 72 generates a logic 1 at its output.

With the logic 1's generated at the outputs of the 2-input NOR gate 72 (with the negative going pulse of the 80th clock pulse), and the inverter 78, and on the line 49, the output of a 3-input NAND gate 101 goes to 0 to close the write clock pulse control gate 55 through the 3-input NAND gate 80 and flip-flop 61. Thus, the gate 55 will pass only 80 clock pulses of 1000 Hz.

The output 1 of the 3-input NAND gate 101 is applied to the reset input R of the flip-flop 98 through an inverter 102 so that the output Q thereof goes to 1. The high output is inverted to a logic 0 by the inverter 99, thereby changing the Data Input DI to "0".

To write 20 white dot data "0", the keys "2" and "0" in the key-board are depressed. Then, a binary code 0010 of "2" is shifted by means of the encoder 87 to outputs Q0, Q1, Q2 and Q3 of the shift register 46, while a binary code 0000 of "0" is to the outputs Q0, Q1, Q2 and Q3 of the shift register 45. After keys "20" are depressed, the white dot switch 4 is depressed. Then, the 2-input NOR gate 95 produces a 0 at its output, so that, similarly to the case in which the black dot switch 3 is depressed, the generation of clock pulses is stopped and the down counters 53 and 54 are preset. Therefore, the binary code 0000 at the BCD output of the shift register 45 is written into the down counter 53, while the code 0010 at the BCD output of the shift register 46 is written into the down counter 54. The write clock pulse control gate 55 is enabled. By releasing the white dot switch 4, clock pulses are provided to the counters 53, 54. Thereafter, similarly to the case in which 80 black dot data "1" are written, when the BCD down counters count 20 clock pulses and the write clock pulse control gate 55 is disabled, thus only 20 clock pulses are permitted to pass through the gate.

The 20 clock pulses to the binary counter 42 sequentially address the address cells of the memory M1 through the address lines. Since the level of the Data input DI has been changed to 0 upon completion of writing the previously mentioned 80 black dot data "1", 20 white dot data "0" are written one after another in the memory M1.

When a total of 100 clock pulses (including the previously applied 80 clock pulses) is completely applied, the output of the multi-input NAND gate 77 will be 0 to close the write clock pulse control gate 55 through the flip-flop 61. Here, write of data for the first cycle in the time chart as in FIG. 2, is over. Similarly, data in the remainders of the 16 cycles in the time chart will be written in the M2, M3,-,M16.

To read the stored data, the cycle select switch 8 is set to "S" to select all the memories and then the start switch 5 is depressed. For example, it is assumed that the preset code switches are set to "58", and the select switch is placed at "0.1 SEC" (1000 Hz), thereby setting a cycle time of 5.8 sec. Each time 58 read clock pulses are applied to the BCD down counters, the 2-input NOR gate 72 passes one read clock pulse to the binary counter 42. Address cells of the memories are addressed via the address lines, and with R/W command "1", data for the 16 cycles are delivered sequentially in parallel from the Data outputs DO of the respective memories. When 100 read clock pulses are applied to the binary counter 42, the multi-input NAND gate 77 produces a logic "0" which is fed through the flip-flop 61 to the read clock pulse control gate 58 which is then closed. Thus, delivery of the data is stopped after one cycle. If the changeover switch 12 is set to ON (repetition), a one cycle end signal "0" is applied through the changeover switch 12 to the 3-input NAND gate 36. This causes the same result as depressing the start switch 5. Thus, data for the 16 cycles are read out repeatedly at the predetermined cycle time of 5.8 seconds.

Figure 7:
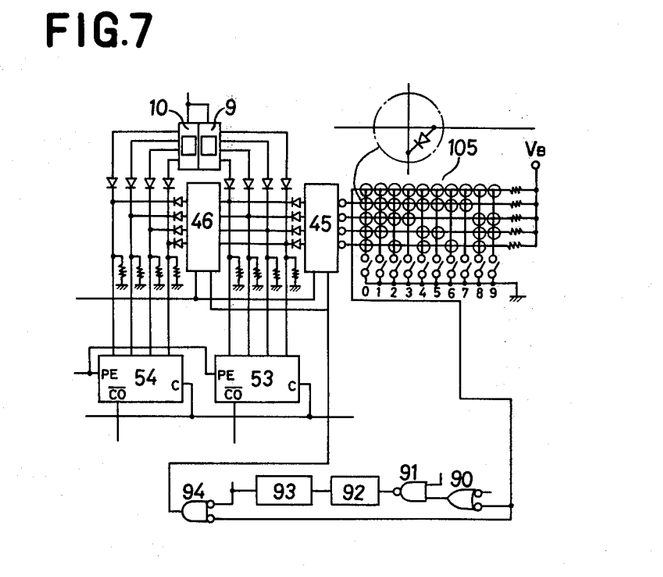
FIG. 7 shows a key switch device using a diode matrix.

FIG. 7 shows another embodiment of the key switch device using a diode matrix 105. The four-bit binary code of the diode matrix is connected to a corresponding BCD line of the shift register 45, and the output on the common line connected to each BCD line is applied to the clock lines of the shift registers 45 and 46 through the 2-input NAND gates 90 and 91, delay circuit 92, one-shot pulse generator circuit 93 and 2-input NOR gate 94. Other portions than the diode matrix 105 are similar to the elements in the previously described key switch device using the encoder, so they will not be explained.

Figure 8:
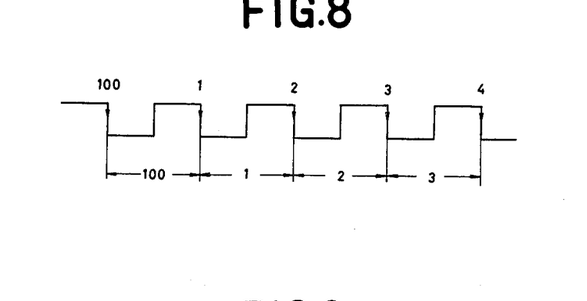
FIG. 8 is a timing diagram.
Figure 9:
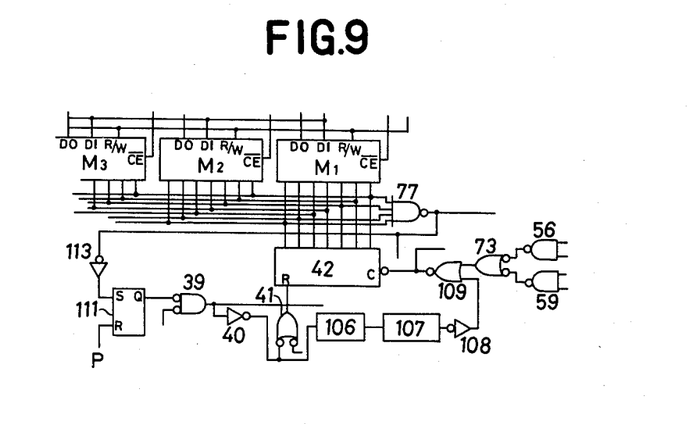
FIG. 9 shows a circuit for clearing the count "0" in a binary counter.
Figure 10:
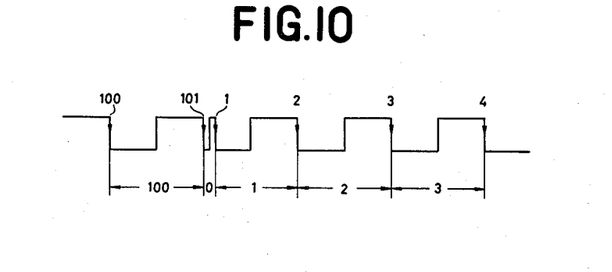
FIG. 10 is a timing diagram for the circuit of FIG. 9.

In order to write the data, the write switch 6 (W) is depressed. Then, as described above, the binary counter 42 is cleared to zero, and each time the write switch 6 (W) is depressed, a logic signal 1 is applied to the 2-input NOR gate 43 which produces a logic 0 output which provides a 1 to each shift register at the Reset input R thereof through the 2-input NAND gate 44. The time chart has 100 data write blocks (see FIG. 2), but only 99 data blocks can practically be written into the address cells of the memories as seen from the clock diagram in FIG. 8. FIG. 9 shows a gate device which permits complete writing of data into 100 address cells, with the zero area eliminated. For this purpose, the input of the 2-input NAND gate 41, which clears the binary counter 42, is fed back to the clock line C of said binary counter 42 through a delay circuit 106, one-shot pulse generator circuit 107, inverter 108 and a 2-input NOR gate 109. Thus, as seen from the clock diagram in FIG. 10, 100 address cells can be completely filled with data. In this case, however, such an arrangement should be made that when the binary counter 42 counts 101 clock pulses, the multi-input NAND gate 77 produces 0, which leads to the completion of a cycle. Since the binary number of "101" is 1100101, the multi-input NAND gate 77 receives as input of address lines Q1, Q3, Q6 and Q7 as shown in FIG. 9.

In the foregoing, the case in which 100 write clock pulses are used has been described. However, a program chart of a higher precision can be prepared using 1,000 write clock pulses. In this case, the total of black and white dot data for one cycle is 1,000. Accordingly, an intended work procedure may be distributed in a stroke with a precision such as 257 black dots and 743 white dots in total of 1,000. Of course, there are provided three preset code switches 9, 10 and 10', shift registers 45, 46 and 46', and down counters 53, 54 and 54', shown in FIG. 11. Further, as shown in FIG. 12, since the binary number of "1,001" is 1111101001, the binary counter 42 must have 10 address lines, and the multi-input NAND gate 77 must receive input lines Q1, Q4, Q6, Q7, Q8, Q9 and Q10. Corresponding to 1,000 write timing clock pulses, the clock pulse outputs are 10,000 Hz, 1,000 Hz, and 50/3 Hz.

Figure 11:
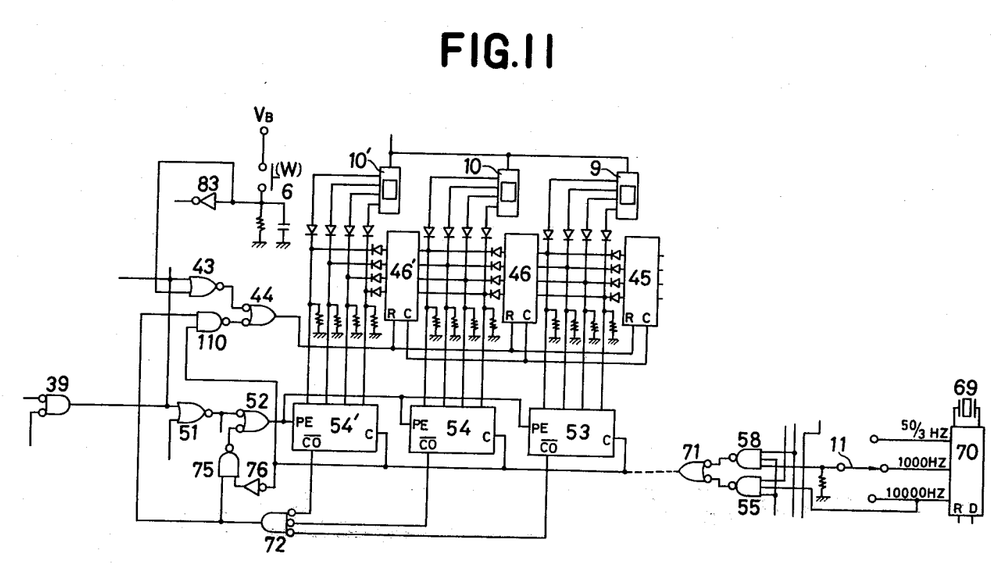
FIG. 11 is a diagram illustrating the interconnection between a down counter, preset code switches and shift register when 1,000 timing clock pulses are used for write.
Figure 12:
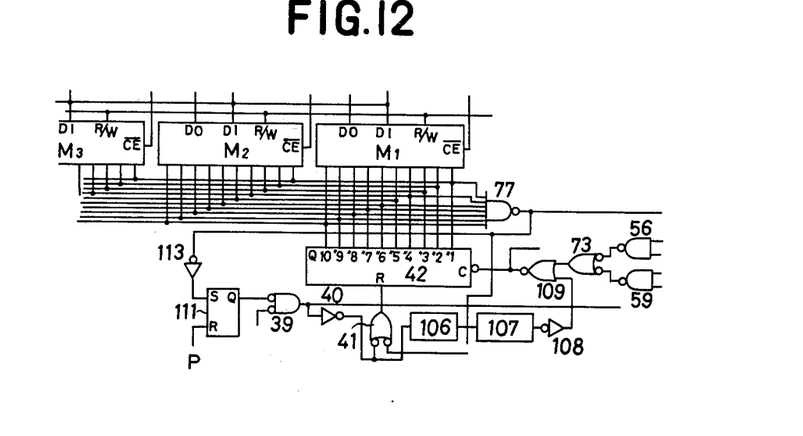
FIG. 12 is a diagram illustrating the interconnection between the binary counter and memories when 1,000 timing clock pulses are used for write.

As apparent from the gate device shown in FIG. 11;
(A) Each time the write switch (W) is depressed, a signal level 1 is applied to the 2-input NOR gate 43 the 0 output of which will provide a logic "1" to each shift register at the Reset input R thereof through the 2-input NAND gate 44.
(B) Upon each completion of one cycle, a logic 1 is applied through the 2-input NOR gate 39, 2-input NOR gate 43 and 2-input NAND gate 44 to the Reset input R of each shift register.
(C) Each time the down counters have counted a preset number, each shift register is applied a logic 1 at the Reset input R thereof through a 2-input NAND gate 110 and the 2-input NAND gate 44.

Since each of the shift registers 45, 46 and 46' is cleared to zero as the case may be, it is possible to prevent the down counters 53, 54 and 54', from erroneously counting.

The action to be taken against possible power failure will now be explained. When the power failure detector circuit detects a service interruption, the signal at the output P thereof goes to a logic 1 so that a 1 is applied to the Reset input R of a flip-flop 111 which will produce 1 at the output Q thereof. Even when the service is restored and the signal at the input R returns to 0, the signal at the output Q is mainted at 1. Since 1 is applied to the input R of a flip-flop 112, a 0 is produced at the output $\overline{Q}$ thereof and thus the signal level on the output line 63 from the 3-input NAND gate 62 changes to a logic 1, and the 2-input NAND gate 79 produces a logic 0 at the output thereof (because the inverter 78 produces a logic 1 with the negative going clock pulse). This output signal 0 is applied through the 3-input NAND gate 80 and flip-flop 61 to the read clock pulse control gate 58 which in turn will be disabled to stop the generation of output signals. Even after electrical service is restored, the disabled state is maintained.

After power restoration, the start switch 5 should be turned on. Then, a logic 0 is applied to the 3-input NAND gate 36. and the one-shot pulse generator circuit 37 produces logic 1 one-shot pulses to provide the 2-input NOR gate 39 with a logic 0 one-shot pulse through the 2-input NAND gate 38. However, since the other input of the NOR gate 39 is maintained at 1 during the power failure and power restoration, the output of the 2-input NOR gate 39 is 0 so that the binary counter 42 is not cleared.

When the one-shot pulse generator circuit 37 produces a one-shot pulse, a logic 0 one-shot pulse appears at the 2-input NAND gate 38. This pulse is applied to the 2-input NAND gate 60 which produces a logic 1 at the output thereof to open the read clock pulse control gate 58 through the flip-flop 61. Then, the binary counter 42 starts counting the remainder of the cycle when locked due to the power failure and produces data correspondingly. When the cycle is completed, the multi-input NAND gate 77 produces 0 at the output thereof to provide a logic 1 to the set input S of the flip flop through an inverter 113, the signal at the output q of the flip-flop changing to 0. Thereafter, the normal state is restored and data is continuously read out corresponding to the cycle time.

Figure 13:
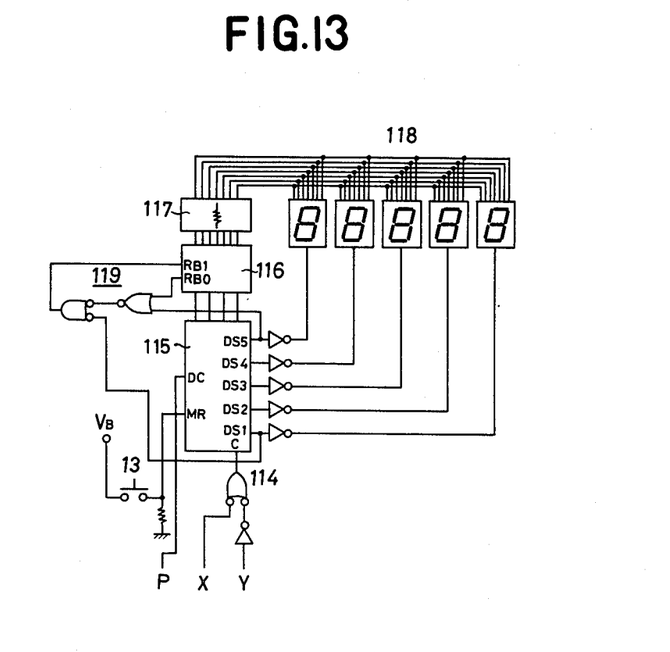
FIG. 13 is a diagram of a display device.

FIG. 13 shows the count indicator which indicates, when in write mode, the respective numbers of data 1's and 0's for storage into the memories, and the production amount when in the read mode. The output X of the write clock pulse control gate 56 and that of the 2-input NOR gate 39, namely, the signal Y obtained upon each completion of one cycle, are connected to a 2-input NAND gate 114 the output of which is connected to a dynamic driving decimal counter 115 at the Clock input C. BCD output of the decimal counter 115 is applied to a decoder driver 116. The output of the decoder driver is connected via a resistor 117 to the anode of each element of an indicator 118. The digit outputs DS1, DS2, DS3, DS4 and DS5 are connected to the cathode of each element of the indicator 118 through inverters. The output P of the power failure detection circuit is connected to the 3-state digit control terminal DC of said decimal counter 115.

The reference numeral 119 depicts a reading zero suppression circuit which suppresses the indication of unnecessary zeros. With the reset switch 13 depressed, the signal at the master reset terminal MR of the decimal counter 115 goes to a 1 to clear all the count indications.

In case of writing, the indicator displays the accumulated numbers of black dot data 1's and white dot data 0's with write clock pulses from line Y. The count indication is cleared by the reset switch 13 after it is confirmed for one cycle that a number of write clock pulses for one cycle is attained.

In reading, the number of products is displayed by the one cycle end signal from the line X. In powder failure, a 1 is applied to the DC by the line P to place a high impedance into each digit line to close it thereby preventing the consumption of the power.

Describing the remote control circuit, the base of the transistor 32 and the ground are connected to a connector 20 (FIG. 4) and further connected to an outer stop switch 120. A connector 21 is connected to the start switch 5 and the further connected to an outer start switch 121. If the switch 120 is turned on, the output of the transistor 32 will be high so that the output of the data stops. If the switch 120 is turned off, this state is maintained. When the switch 121 is turned on, the data output is started.

Describing the abnormality detecting circuit, a collector of a photo transistor of a photo coupler 123, which is pulled up by a resistor 122, is connected to the ground through the emitter, and light emitting diode is connected to a connector 16 to which an outer abnormality detecting circuit is connected. When the detecting circuit detects any abnormality, the photo-coupler 123 turns on. Accordingly, the 3-input NAND gate 62 receives a 0 input while its output goes to 1. Through the 2-input NAND gate 79, 2-input NAND gate 80 and flip-flop 61, the read clock pulse control gate 58 is enabled thus the delivery of an output signal is stopped.

Figure 14:
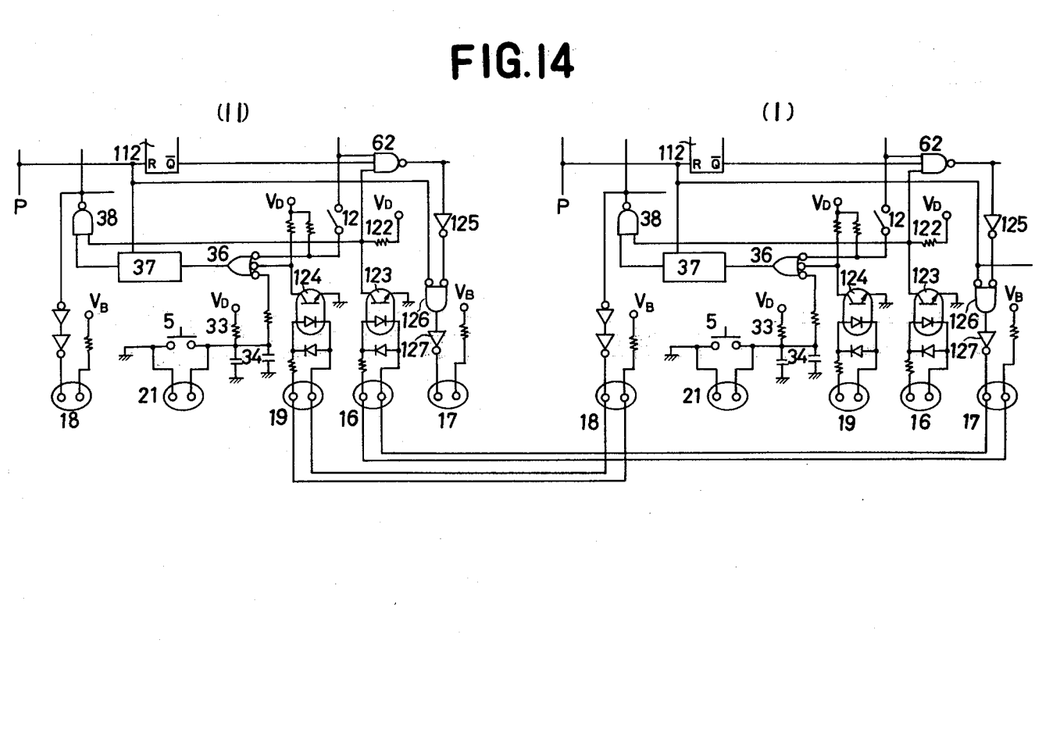
FIG. 14 is an explanatory diagram in which two sequence controllers are connected for increasing the number of the cycle.

In order to extend the number of cycles of operation by connecting together a plurality of the subject sequence controllers, the connector 18 of one sequence controller (I) is connected to the connector 19 of another sequence controller (II) as illustrated. When the start switch 5 of the first sequence controller is depressed, the photo coupler 124 of the second sequence controller (II) turns on to apply a logic 0 signal to the 3-input NAND gate 36. This will result in the same operation as if the start switch 5 of the second sequence controller (II) is depressed. Thus, both the controllers will provide output signals in synchronism with each other. With two sequence controllers connected together at their connectors, data for 32 cycles are obtainable, while by connecting together three such sequence controllers, data for 48 cycles of operation are provided; in both cases, the output signals are delivered in parallel.

When two sequence controllers are interconnected, when the external abnormality detection circuit detects an abnormality with the result that the first sequence controller (I) stops generating an output, the second sequence controller (II) also should stop generating an output at the same time. As shown in FIG. 14, the first sequence controller (I) is connected at the connector 17 thereof to the connector 16 of the second sequence controller (II). When the external abnormality detection circuit detects any abnormality, the photo coupler 123 turns on so that the output of the 3-input NAND gate 62 goes to 1. Thus, a logic signal 1 is applied through an inverter 125 to a 2-input NOR gate 126 of which another input is connected to the output of the power failure detection circuit. Thus, the signal level at this other input will be 0. Namely, both the inputs of the 2-input NOR gate 62 are 0 so that the gate will provide a logic 1. As a result, an inverter 127 will produce a logic 0. In this way, the photo coupler 123 in the second sequence controller (II) turns on, while the 3-input NAND gate 62 will produce a logic 1 to close the read clock pulse control pulse 58 through the 2-input NAND gate 79, 3-input NAND gate 80 and flip-flop 61. Thus, the delivery of data from the sequence controllers (I) and (II) is stopped simultaneously.

Figure 15:
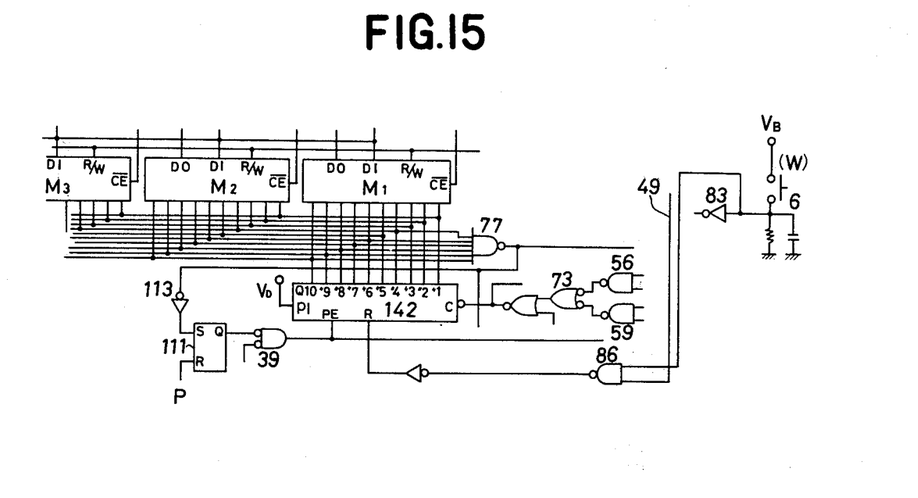
FIG. 15 shows another example of the binary counter.

FIG. 15 shows another embodiment of the present invention in which a presettable up counter 142 is employed in place of the binary counter 42 as shown in FIGS. 5 and 12.

In writing, when the write (W) switch 6 is depressed, the output of the 2-input NAND gate 86 will be 0, thus applying a 1 to the reset input R of said presettable up counter 142 through the inverter to clear the count in the up counter 142. When a first write clock pulse arrives from the clock line C, the 10 address lines (write timing clock pulses are 1,000 in number) will be "0000000001" to address the first address cell in the memory. Similarly, when the 1,000th clock pulse arrives, the address lines will be "1111101000" in binary number to address the 1,000th address cell in the memory. The data will then be written into these address cells.

At the time of entering data, with the start switch 5 depressed, the 2-input NOR gate 39 will deliver a logic 1 one-shot pulse which is applied to the Preset Enable input PE of the presettable up counter 124 to preset the count in this counter. Thus, the address lines will be "0000000001" in binary number (with the preset input P1 connected to VD and P1, P2, P3,-, P10 connected to the ground) to address the first address cell. When a first write clock pulse arrives at the clock line C, the address lines change to "0000000010" in binary number, thus addressing the second address cell. Similarly, when 1,000th clock pulse is received, the 1,000th address cell is addressed. For this while, the data "1" in the first address cell is delivered at the data output. On the other hand, at the end of the 1,000th clock pulse, and 10 address lines change to "1111101001" in binary numbers, and at the same time, the multi-input NAND gate 77 which receives as inputs the address lines Q4, Q6, Q7, Q8, Q9 and Q10, will deliver a cycle end signal "1". With this signal, the presettable up counter is preset, and the count becomes "0000000001" in binary number. Here the above operation is repeated.

FIG. 16 shows in the form of block diagram a memory array in which four N words×1 bit memories are built in parallel; FIG. 17 shows the block diagram of a memory array in which eight N words×1 bit memories are built in parallel; and FIG. 18 shows a block diagram of a memory array in which 16 N words×1 bit memories are built in parallel.

By incorporating a counter 42 in each of said memories (not shown), the address pins Q1, Q2,-, Qn become unnecessary. Thus, the number of memory address pins may be markedly reduced, which will be one of the great advantages of the present invention.

Figure 19:
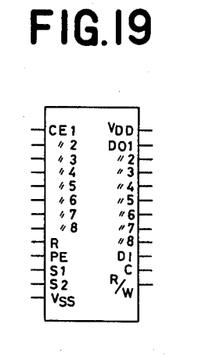

FIG. 19 shows in the form of block diagram a memory array in which eight N words×1 bit memories incorporating a presettable up counter 142 are arranged.

In the illustration, the reference symbol C depicts a clock pulse input pin, S1 and S2 are one-cycle end output pins, respectively, of which S1 is for one cycle composed of 100 clock pulses, while S2 is for one cycle composed of 1,000 clock pulses. The number of these pins may be increased or reduced as necessary. Similarly to this case, a memory for 16 cycles may be configurated.

Figure 20:
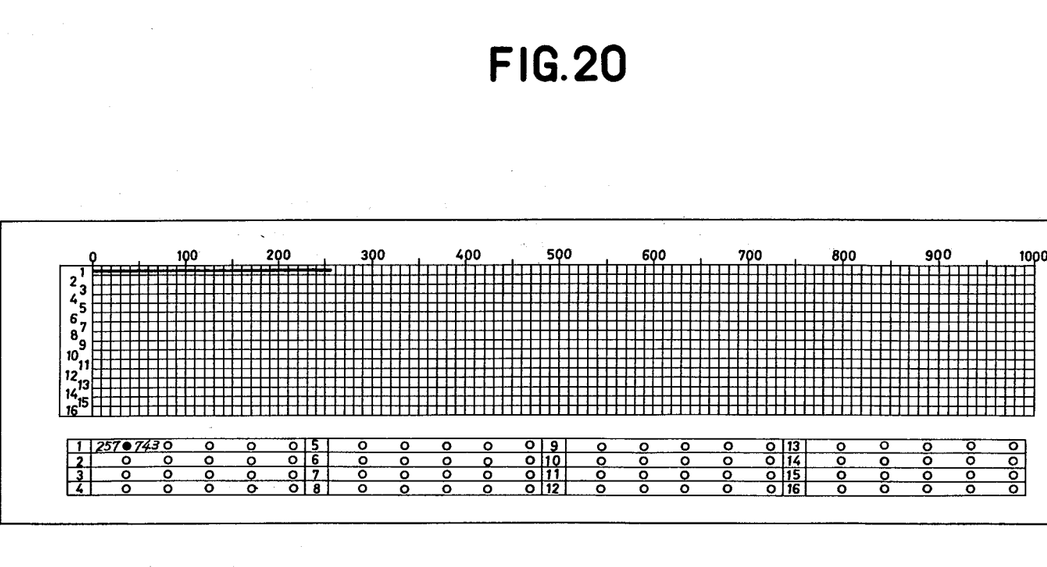
FIG. 20 shows an example of the memory sheet for use when 1,000 timing clock pulses are used for write.

FIG. 20 shows a memory sheet for use with 1,000 write timing clock pulses. With this memory sheet, it is possible to control an operation sequence more precisely as compared with the memory sheet shown in FIG. 2.

The sequence control system according to the present invention is very compact and of high performance, and with this system those who unskilled in the art can program extremely easily and rapidly program data for sequence control and modify the program once made. Therefore, the present invention greatly facilitates the automation of the machines in wide fields of industry, and thus saves labor to significant extent. The present invention also contributes very much to energy savings.

I claim:

1. A sequence control system controlling the condition of a plurality of outputs comprising:
   means for placing said system in a read mode;
   clock pulse generating means for producing clock pulses;
   presettable counter means for counting a preset number of clock pulses and producing an output timing pulse each time said preset number of clock pulses is accumulated;
   binary counter means for counting the output timing pulses produced by said presettable counter means, said binary counter means accumulating a count representative of one cycle of system operation;
   memory means operatively connected to and addressed by said binary counter means, said memory means storing zeros and ones data, the total number of zeros and ones representing a cycle of said control system being stored therein at respective addresses which correspond in number to a predetermined number of output pulses also representative of a cycle of said control system;
   keyboard means for entering data representative of on and off durations of the outputs of said control system;
   encoder means for converting said data entered into said keyboard means into a binary coded decimal signal;
   shift register means for shifting said binary coded decimal signal produced by said encoder means into said presettable counter;
   data switch means for entering said zeros and ones data;
   a read start switch for activating the read mode;
   first gate means responsive to actuation of said data switch means for enabling the shift of said binary coded decimal signal into said presettable counter;
   second gate means responsive to actuation of said data switch means for enabling the counting operation of said binary counter means;
   third gate means responsive to the operation of said presettable counter means, when in the read mode for disabling said second gate means when a number of pulses corresponding to the preset number of said presettable counter means have been accumulated therein;
   fourth gate means operatively connected between the output of said binary counter means and said second gate means for disabling said second gate means after the number of output timing pulses corresponding to a full cycle have been generated by said binary counter means;
   means operatively connected to said memory means for sequentially scanning respective addresses therein and for controlling said outputs based on the contents of said addresses;
   said ones and zeros stored in said memory means being representative of the state of a respective output at a particular point during said cycle.

2. The system of claim 1 wherein said presettable counter means includes;
 a presettable counter having preset lines;
 a presettable code switch connected to said presettable counter at the preset lines thereof;
 and wherein said system further comprises;
 fifth gate means for sensing the application of power to said system and enabling the counting operation of said presettable counter upon detection thereof;
 sixth gate means responsive to said second gate means for enabling the application of said output of presettable counter means to said binary counter means to thereby address said memory means.

3. A sequence control system according to claim 2, in which a memory sheet is used to enable entries to be introduced into said keyboard means in any suitable manner, said memory sheet having printed graduation scales for writing therein the times corresponding to the number of the timing clock pulses in one cycle and for writing therein 1 and 0 data.

4. The sequence control system of claim 2 wherein said first gate means is provided between said data switch means and a preset enable terminal of said presettable counter.

5. The sequence control system of claim 2 wherein said data switch means includes a 1 switch and a 0 switch; and
 wherein said second gate means is enabled by releasing said 1 switch or said 0 switch.

6. The sequence control system of claim 2 wherein said presettable counter means produces 100 output pulses per cycle, and wherein said clock pulse generating means produces said clock pulses at a rate of 1000 Hz, 100 Hz or 5/3 Hz, said clock pulses also being provided to said second gate means.

7. The sequence control system of claim 2 wherein said presettable counter means produces 1000 output pulses per cycle, and wherein said clock pulse generating means produces said clock pulses at a rate of 10,000 Hz, 1000 Hz or 50/3 Hz, said clock pulses also being provided to said second gate means.

8. The sequence control system of claim 2 wherein said system further comprises:
 power stoppage detecting means for detecting abnormal power supply characteristics;
 supplemental power supply means for supplying power to said memory means to maintain the contents thereof.

9. The sequence control system of claim 1 wherein the keyboard means supplies signals representative of said data to a multi-input gate, the output of said multi-input gate being applied to a clock line of said shift register means through a delay circuit and one shot pulse generating circuit.

10. The sequence control of claim 1 further comprising clock pulse controlling gate means responsive to said clock pulse generating means for enabling introduction of clock pulses into said presettable counter means.

* * * * *